United States Patent [19]

Tsukamoto

[11] Patent Number: 4,564,155
[45] Date of Patent: Jan. 14, 1986

[54] EMERGENCY LOCKING TYPE RETRACTOR PROVIDED WITH A TAKE-UP FORCE LOCKING MECHANISM

[75] Inventor: Masahiro Tsukamoto, Fujisawa, Japan

[73] Assignee: NSK-Warner K. K., Tokyo, Japan

[21] Appl. No.: 621,569

[22] Filed: Jun. 18, 1984

[30] Foreign Application Priority Data

Jun. 29, 1983 [JP] Japan .............................. 58-99398[U]

[51] Int. Cl.$^4$ ........................ A62B 35/02; B65H 75/48
[52] U.S. Cl. ...................... 242/107.4 A; 242/107.4 B; 242/107.6
[58] Field of Search ............. 242/107.7, 107.6, 107.12, 242/107.4 A, 107.4 B; 280/806–808; 297/475–478

[56] References Cited

U.S. PATENT DOCUMENTS

| | | | |
|---|---|---|---|
| 4,261,530 | 4/1981 | Asai et al. | 242/107.6 X |
| 4,373,684 | 2/1983 | Naito | 242/107.6 |
| 4,385,737 | 5/1983 | Gulette et al. | 242/107.7 |
| 4,391,421 | 7/1983 | Naitoh et al. | 242/107.7 |

*Primary Examiner*—John M. Jillions
*Attorney, Agent, or Firm*—Shapiro and Shapiro

[57] ABSTRACT

According to the present invention, the problem that both of the draw-out and the rewinding of a belt become impossible when take-up force locking means and emergency locking means are combined together can be solved by simply adding releasing means for bringing the take-up force locking means into its inoperative condition.

6 Claims, 7 Drawing Figures

EMERGENCY LOCKING TYPE RETRACTOR PROVIDED WITH A TAKE-UP FORCE LOCKING MECHANISM

BACKGROUND OF THE INVENTION

1. Field of the Invention

This invention relates to an emergency locking type retractor provided with a belt take-up force locking mechanism, and more particularly to an emergency locking type retractor in which when the take-up force locking mechanism is in its operative condition and locks or is about to lock the belt take-up force, and an emergency locking mechanism operates to lock the draw-out of a belt, the take-up force locking mechanism is rendered inoperative and the belt take-up force is caused to work.

2. Description of the Prior Art

In a retractor provided with a take-up force locking mechanism and an emergency locking mechanism, when the take-up force is locked or is about to be locked by the take-up force locking mechanism, if the emergency locking mechanism operates for some cause such as, for example, the belt being drawn out from a memory position for locking the take-up force in the operative condition of the take-up force locking mechanism and thereafter being rapidly rewound and suddenly returned to said memory position, the belt being suddenly drawn out or the vehicle body becoming inclined on a sloping road or the like, there is an undesirable possibility lock-up condition in which the belt cannot be again drawn out and the rewinding of the belt becomes impossible by the take-up force locking mechanism. In such a situation, the belt cannot be moved in any direction, and this is very inconvenient and undesirable in respect of safety.

SUMMARY OF THE INVENTION

It is therefore an object of the present invention to provide an emergency locking type retractor provided with take-up force locking means in which means is provided for rendering the take-up force locking means inoperative if emergency locking means operates when the take-up force locking means is in its operative condition, thereby preventing the situation as described above from arising.

The invention will become fully apparent from the following detailed description thereof taken in conjunction with the accompanying drawings.

DESCRIPTION OF THE PREFERRED EMBODIMENT

Figure 1:
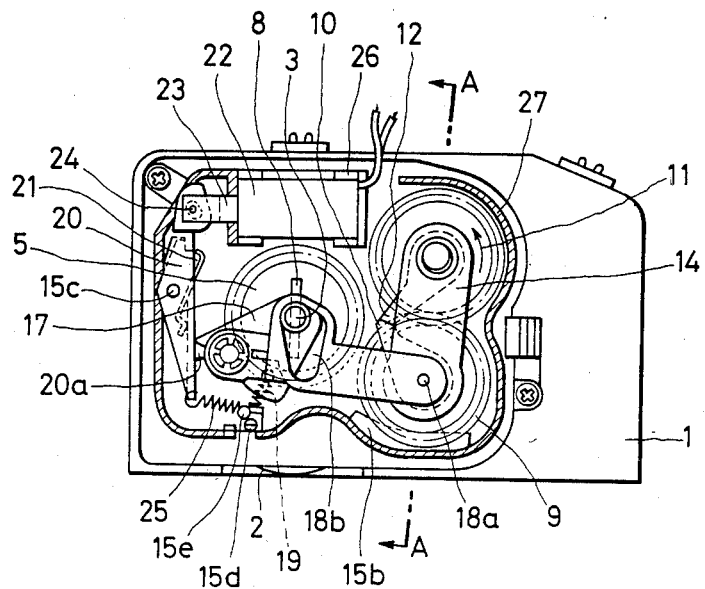
FIG. 1 is a front view of portions of an embodiment of the present invention.

An embodiment of the present invention will hereinafter be described. As shown in FIGS. 1-4, the base member of a retractor has two opposed side plate portions 1 (only one of which is seen in FIG. 1) and a base portion 2 extending therebetween. Reel shaft means 3 is rotatably supported between the side plate portions 1 and is biased in a counter-clockwise direction as viewed in FIG. 1, which is the belt take-up direction provided by a belt take-up spring 4 (FIG. 4) on the side plate portion 1 inside the mechanism seen in FIG. 1.

Figure 4:
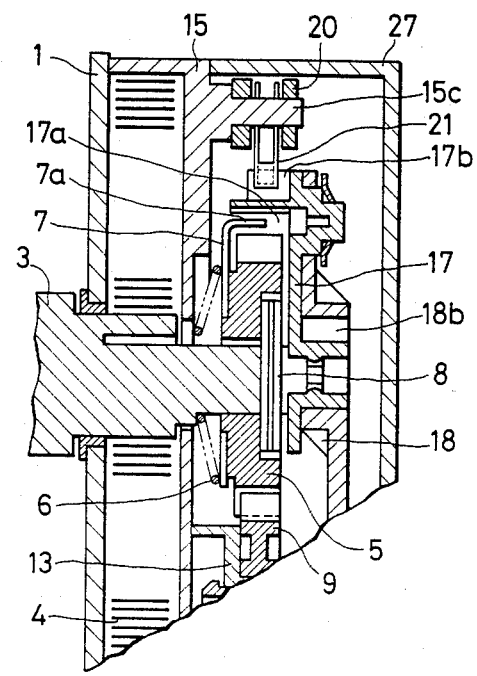
FIG. 4 is a cross-sectional view taken along line B—B of FIG. 2.

As shown in FIG. 4, mounted on one end of the shaft means 3 is a main gear 5 so as to be rotatable therewith. A conical spring 6 is provided between the main gear 5 and a shoulder formed on the shaft of the reel shaft means 3 and urges a horned disk 7 against the back of the main gear 5 with a suitable force. The main gear 5 is mounted on the reel shaft means 3 by means of a shear pin 8.

Figure 3:
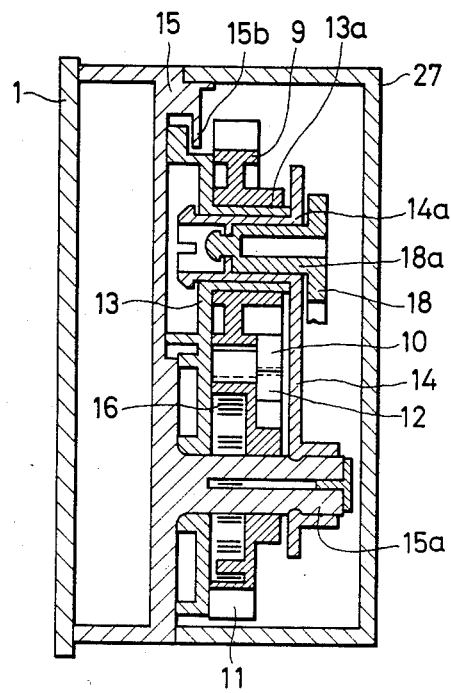
FIG. 3 is a cross-sectional view taken along line A—A of FIG. 1.

Take-up force locking means has an idle gear 9 movable between a position in which it meshes with the main gear 5 and a position in which it does not mesh with the main gear 5, a first cam 10 integral with the idle gear 9 and extending radially, a stop gear 11 meshing with the idle gear 9, and a second cam 12 integral with the stop gear 11 and extending radially. As shown in FIG. 3, the idle gear 9 is rotatably fitted in the cylindrical portion 13a of a shifter 13 between the shifter 13 and a fastening plate 14, and the stop gear 11 is rotatably fitted in the shaft portion 15a of the lower cover 15 of the take-up spring 4 between the shifter 13 and the fastening plate 14.

In the present embodiment, to prevent tooth skip and tooth breakage, the lower cover 15 is formed with a portion 15b for preventing floating of the shifter 13.

The lower portion of the stop gear 11 provides a cup portion which contains a return spring 16 therein, and the stop gear 11 is biased counter-clockwise as viewed in FIG. 1, whereby when the take-up force locking means is not in mesh engagement with the main gear 5, the first cam 10 may always bear against the second cam 12 in the position of FIG. 1 so that the gears 9 and 11 may be in a first mutual rotation blocking position shown in FIG. 1. Another mutual rotation blocking position will be realized when the gears 9 and 11 rotate counter-clockwise and clockwise, respectively, from their positions of FIG. 1 and due to the difference in number of teeth between the gears 9 and 11, the cams 10 and 12 cause a positional deviation during each one full rotation thereof, whereby the cams 10 and 12 come to positions substantially symmetrical with their positions of FIG. 1 with respect to a line passing through the centers of the gears 9 and 11. In this second mutual rotation blocking position, the gears 9 and 11 are unrotatable counter-clockwise and clockwise, respectively, as viewed in FIG. 1.

A lever 18 constituting a toggle link mechanism with a link arm 17 has the pivot pin portion 18a at one end thereof loosely mounted in the cylindrical portion 14a of the fastening plate 14. The lever 18 also has in the intermediate portion thereof a lever rotation range limiting slot 18b in which is received the outer end of the reel shaft means 3, and is turning-pair-connected to the link arm 17 at the other end thereof. The link arm 17 is rotatably connected to the outer end of the reel shaft means 3 at the other end thereof.

A sector-shaped depression 17a into which the horn portion 7a of the disk 7 has entered and which is open by a predetermined angle is formed in the inner side surface of the link arm 17, and a projection 17b performing the function to be described on the outer side thereof.

Such a toggle link mechanism is biased by a coil spring 19 and always tends to assume the position of FIG. 1.

A trigger member 20 is rotatably mounted about a shaft portion 15c formed on the lower cover 15, and a lever hook spring 21 jutting out as shown in FIG. 1 to engage the projection 17b of the link arm 17 is contained in the hollow portion in the interior of the trigger member 20. One end of the trigger member 20 is coupled to the plunger 23 of a solenoid assembly 22 by a spring pin 24 and the other end of the trigger member 20 has secured thereto a coil spring 25 and is biased counter-clockwise as viewed in FIG. 1, and it has a pawl portion 20a for engaging the projection 17b of the link arm 17.

The solenoid assembly 22 is fixed to a mounting portion 26 coupled to the lower cover 15, and the plunger 23 is attracted when the solenoid assembly is energized. Projections 15d and 15e to which springs 19 and 25 are secured are formed integrally with the lower cover 15, whereby the procedure of fixing these projections onto the lower cover one by one is eliminated, and this leads to improved productivity.

A cover 27 for covering the above-described elements on the lower cover 15 is fixed to the lower cover. This eliminates the necessity of fixing the cover 27 by the use of screws or the like, and this also leads to enhanced productivity.

Figure 6:
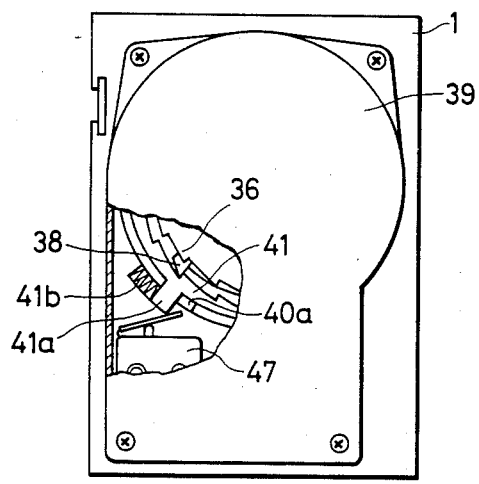
FIGS. 6 and 7 illustrate the operation of the embodiment.
Figure 7:
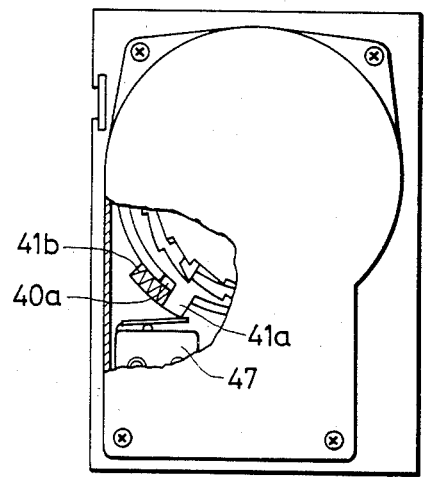
Figure 5:
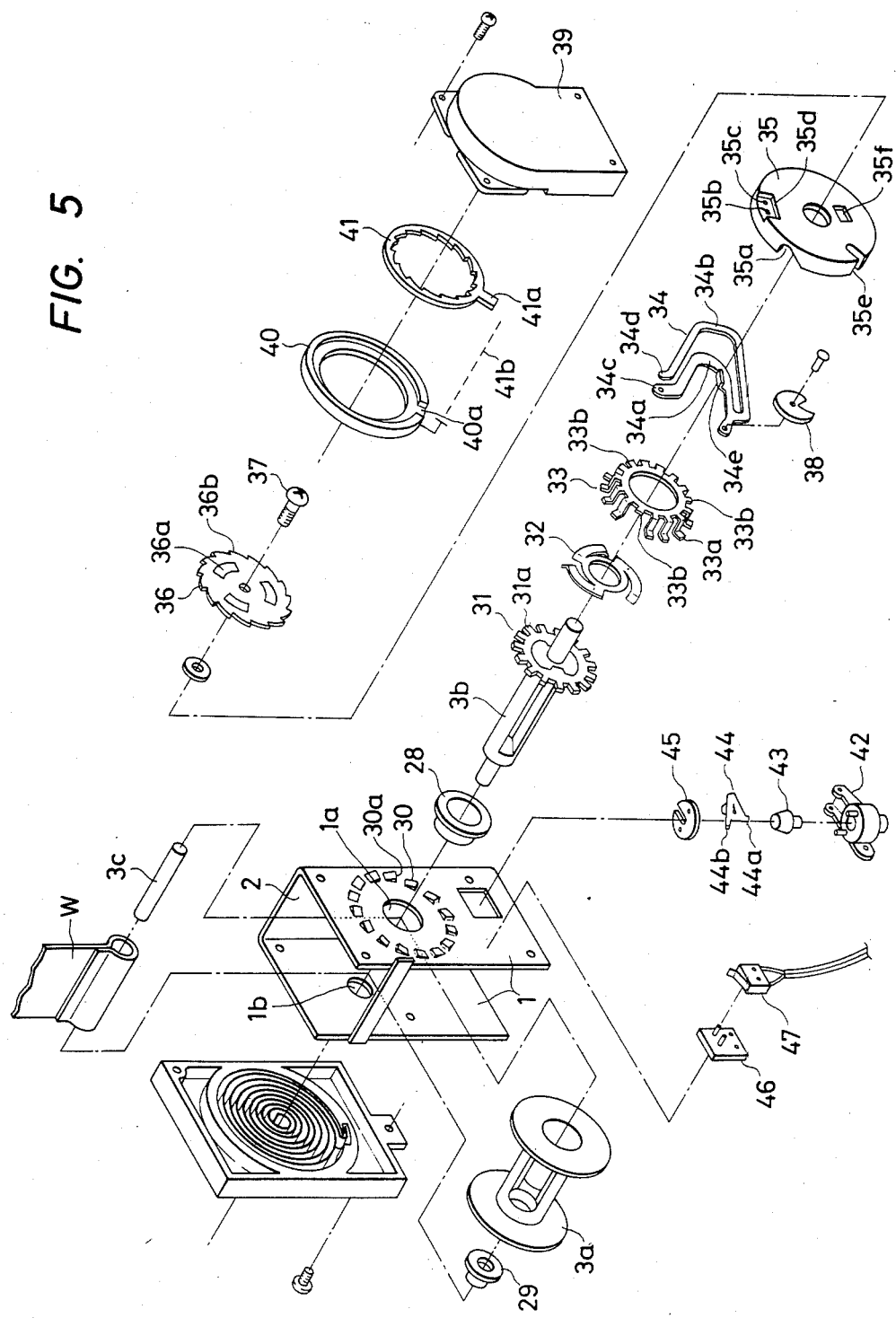
FIG. 5 is an exploded perspective view of portions of the embodiment of the present invention.

Reference is now had to FIGS. 5 to 7 to describe a portion of the emergency locking mechanism of the present embodiment. As shown in the exploded perspective view of FIG. 5, this portion is provided on the side plate portion 1 opposite to that side on which the take-up force locking mechanism is present. The previously described reel shaft means 3 is constructed with the shaft 3b passed through a bobbin 3a and a belt W mounted in a groove formed therein by a rod 3c against slippage. Also, the reel shaft means 3 is supported by circular holes 1a and 1b formed in the side plate portions 1, through bearings 28 and 29. Axial movement of the reel shaft means is controlled by a stop ring, not shown.

A plurality of (fifteen in FIG. 5) locking projections 30 are equidistantly formed around the circular hole 1a of the side plate portion 1 on this side of the base member, and the clockwise rotation sides of these projections 30 provide latch surfaces 30a. A latch plate 31 is mounted on the outer end of the shaft 3b for rotation therewith, and the same number of latch teeth 31a as the number of the projections 30 are equidistantly formed on the outer periphery of the latch plate 31. On the further outer end of the shaft 3b outward of the latch plate 31, a latch-up spring 32, a latch ring 33, a latch frame 35 having a sensor spring 34 attached thereto, and a sensor ratchet 36 are loosely fitted in succession by means of a set pin 37. The latch ring 33 is axially movable and is biased outwardly by the latch-up spring 32, and the axially extending portions of the L-shaped teeth 33a thereof are always in mesh engagement with the latch plate 31. The number of the teeth 33a is twelve, and totals fifteen if protrusions 33b formed at an interval of 120° and engaged with the cam surface 35a of the latch frame 35 are added thereto.

The sensor spring 34 is in the form of a plate and has a portion 34a which is great in rigidity and a portion 34b which is small in rigidity, the ends 34c and 34d of these portions being attached to the pin portions 35b and 35c, respectively, of the latch frame 35. The sensor spring 34 extends so that it enters the inside of the latch frame 35 through the window portion 35d thereof and by-passes the shaft 3b, and the junction between the two portions 34a and 34b lies at the cut-away portion 35e of the latch frame 35. A locking piece 38 is rotatably mounted on said junction and, when the sensor spring 34 is deformed and the locking piece 38 juts out from the cut-away portion 35e, the locking piece may mesh with the internal tooth of a ratchet gear 41 held between a sensor cover 39 secured to the side plate portion 1 and a guide member 40 secured to the cover 39. The ratchet gear 41 has a projection 41a which extends into the groove 40a of the guide member 40, and the ratchet gear 41 is rotatable relative to the guide member 40 within a range in which the projection 41a strikes against the opposite side walls of the groove 40a. A spring 41b is extended between the ratchet gear 41 and the cover 39 to bias the ratchet gear 41 clockwise relative to the cover 39. The sensor spring 34 also has a bent portion 34e which extends through the hole 35f of the latch frame 35 into one of the window portions 36a of sensor ratchet 36 as an inertia member. This bent portion 34e normally bears against the right end of the hole 35f of the latch frame with the aid of the spring force of the sensor spring 34.

A support 42 is secured to the lower portion of the side plate portion 1, and a weight 43 is placed in the hollow portion of the support 42 and a ratchet lever 44 having a projection 44a and a latch portion 44b is rockably mounted on the weight 43. Further, a support cover 45 is attached to the support 42. When the weight 43 becomes inclined and the ratchet lever 44 rocks upwardly, the latch portion 44b of the ratchet lever 44 may come into mesh engagement with a tooth 36b of the sensor ratchet 36.

A reed switch holder 46 is further secured to the lower portion of the side plate portion 1 and a reed switch 47 which performs a function to be described is attached to the reed switch holder 46.

Operation of the present embodiment will now be described on the basis of the above-described construction. Description will first be made of the take-up force locking mechanism.

When one who desires to wear the belt draws out the belt from the retractor, the reel shaft means rotates clockwise as viewed in FIG. 1. At this time, the disk 7 also begins to rotate and, when the horn portion 7a bears against the upper end of the depression 17a of the link arm 17 as viewed in FIG. 1 and somewhat rotates the link arm clockwise, the projection 17b of the link arm becomes engaged with the pawl portion 20a of the trigger member 20, whereby the counter-clockwise rotation of the disk 7 is stopped and only the reel shaft means 3 and the main gear 5 are rotated while sliding friction is created between the disk 7 and the main gear 5.

When a tang (not shown) is inserted into the buckle (not shown) of the seat belt when a suitable length of the belt has been drawn out, a buckle switch (not shown) series-connected to the reed switch 47 is closed and, if the emergency locking mechanism is not working and the ratchet gear 41 is in its position of FIG. 6 in accordance with the force of the spring 41b and the reed switch 47 is in its ON state, then power is supplied to the solenoid assembly 22 and the plunger 23 is subjected to attraction. However, when the tang is inserted while the belt is drawn out, the pawl portion 20a of the trigger member 20 is in mesh engagement with the projection 17b of the link arm 17 and therefore, the trigger member 20 cannot rotate counter-clockwise as viewed in FIG. 1 even if the plunger 23 is subjected to attraction.

Accordingly, the belt drawn out is taken up over its excess amount by the take-up spring (the belt fits to the body), whereby the disk 7 is rotated counter-clockwise with the reel shaft means 3, and unless after the lever 18 and the link arm 17 are also rotated counter-clockwise by the return spring 19 and the pawl portion 20a of the trigger member is disengaged from the projection 17b of the link arm, the trigger member 20 cannot be rotated clockwise by the solenoid assembly which is in its attracting condition. The state in which the trigger member has been rotated clockwise is shown in FIG. 2.

Thereafter, due to the draw-out of the belt by the leaning of the upper part of the belt wearer's body or by the belt wearer's hand, the disk 7 is again rotated clockwise with the reel shaft means 3 by a predetermined angle of opening determined by the depression 17a of the link arm so as to endow the belt with ideal slack, whereafter the lever 18 and the link arm 17 are also rotated counter-clockwise. Since the trigger member 20 has already rotated counter-clockwise, the counter-clockwise rotation of the lever and the link arm by the disk 7 is not hampered by the pawl portion 20a, and the projection 17b of the link arm 17 flexes the lever hook spring 21 installed in the trigger member and rides thereonto and the lever and the link arm rotate clockwise until the edge of the slot 18b of the lever 18 bears against the end of the reel shaft means 3. Here, the lever 18 and the link arm 17 together form a toggle state and rotate the shifter 13 clockwise as viewed in FIG. 2 to thereby establish mesh engagement between the main gear 5 and the idle gear 9. The state in which the take-up force locking means and the reel shaft means have thus become operatively associated with each other is shown in FIG. 2.

Figure 2:
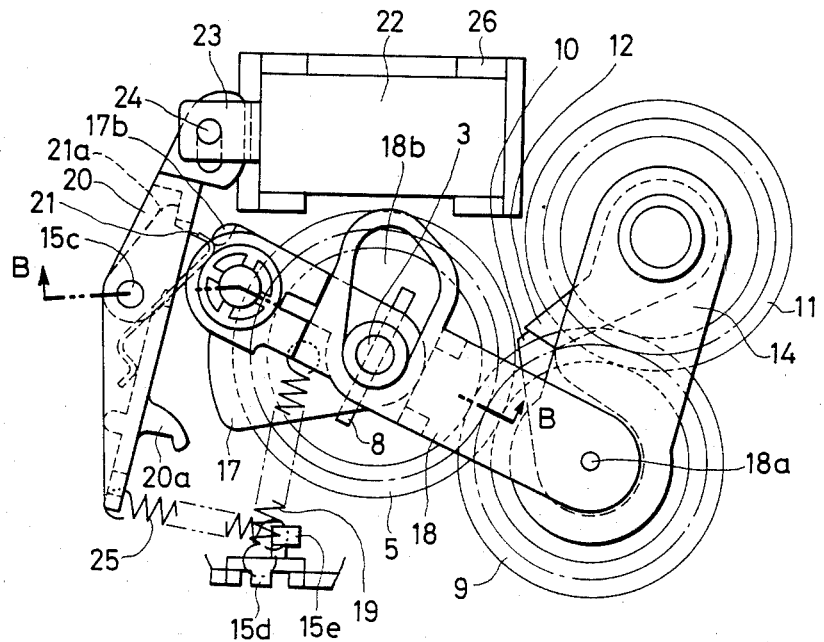
FIG. 2 illustrates the operation of the embodiment.

In the state of FIG. 2, the rotation of the reel shaft means 3 in counter-clockwise direction, which is the belt take-up direction, is controlled by the cams 10 and 12 and therefore, the force of the take-up spring does not act on the belt. However, the rotation of the reel shaft means 3 in clockwise direction, which is the belt draw-out direction, is possible until the cams 10 and 12 come to the aforementioned second mutual rotation blocking position. The degree of this belt draw-out may be adjusted by suitably determining the ratio of the number of teeth of the three gears 5, 9 and 11.

The reason why in the state of FIG. 2 the link arm 17 cannot return in counter-clockwise direction is that the lever hook spring 21 can rotate counter-clockwise but its clockwise rotation is controlled by the stopper portion 21a.

Thus, in the belt wearing condition, ideal slack is reliably set and the belt take-up force is zero and draw-out and take-up of the belt is possible in a suitable range from the belt wearing position.

When the tang is removed from the buckle, the aforementioned buckle switch becomes open and the supply of power to the solenoid assembly 22 is stopped and the trigger member 20 is returned to its original position by the force of the return spring 25 while, at the same time, the toggle link mechanism is also returned to its original position by the force of the return spring 19. Accordingly, the mesh engagement between the main gear 5 and the idle gear 9 is released and the whole amount of the belt so far drawn out is taken up by the restored force of take-up spring.

Operation of the emergency locking mechanism will now be described. When a speed change of a predetermined value or more occurs to the vehicle body, the weight 43 becomes inclined and in accordance therewith, the ratchet lever 44 rocks upwardly. At the same time, the belt W is drawn out and the shaft 3b rotates counter-clockwise. Accordingly, the ratchet lever 44 comes into mesh engagement with the sensor ratchet 36 to thereby stop the rotation of the latter. The latch frame 35 and the sensor spring 34 try to rotate with the shaft 3b through the shaft 3b, the latch-up spring 32 and the latch ring 33 and therefore, a phase difference occurs between the latch frame 35 and the sensor ratchet 36, whereby the sensor spring 34, with the bent portion 34e engaged with the window 36a of the sensor ratchet 36, is twisted and the locking piece 38 attached to the turned-back portion thereof jumps out through the cut-away portion 35e of the latch frame 35. Consequently, the locking piece 38 comes into mesh engagement with an internal tooth of the ratchet gear 41 as shown in FIG. 6. Thereby the ratchet gear 41 is rotated counter-clockwise against the force of the spring 41b and, when the projection 41a bears against the side wall of the groove 40a on the counter-clockwise direction side thereof as shown in FIG. 7, the counter-clockwise rotation of the ratchet gear 41 is stopped with the counter-clockwise rotation of the latch frame 35, etc. At this time, the reed switch 47 is switched off by the projection 41a as shown in FIG. 7 and therefore, the supply of power to the solenoid assembly 22 is stopped and as in the aforementioned case where the tang is removed from the buckle, the trigger member 20 is returned to its original position by the force of the spring 25 while, at the same time, the toggle link mechanism is also returned to its original position by the force of the spring 19. Accordingly, the mesh engagement between the main gear 5 and the idle gear 9 is released and the take-up force locking mechanism becomes inoperative and thus, it becomes possible to take up the belt. Since the latch ring 33 tries to continually rotate counter-clockwise with the shaft 3b through the latch-up spring 32, the protrusion 33b thereof is guided by the cam surface 35a of the latch frame 35 and the latch ring 33 moves axially inwardly while being guided by the tooth 31a of the latch plate 31 against the biasing force of the spring 32. Thus, the teeth 33a of the latch ring 33 comes into mesh engagement with the latch surfaces 30a of the projections 30 of the side plate portion 1, whereby the rotation of the latch ring is stopped. Accordingly, the side plate portion 1 and the latch plate 31 become connected together by the latch ring 33 and the rotation of the shaft 3b is also stopped. Thus, if the take-up force locking mechanism is in its operative condition, it will be brought into its inoperative condition and substantially simultaneously therewith, the emergency locking mechanism will be brought into its operative condition.

What has been described above substantially applies to the webbing speed sensing mechanism. When the belt W is drawn out rapidly (that is, when the draw-out speed changes by a predetermined value or more), the shaft 3b, the latch ring 33, the latch frame 35 and the springs 32 and 34 try to rotate together, whereas the sensor ratchet 36 is delayed with respect to this rotation due to its inertia, whereby a phase difference occurs between the sensor ratchet 36 and the latch frame 35. Thereafter, by the same process as that followed by the vehicle body sensing type mechanism, the reed switch 47 is switched off and the rotation of the shaft $3b$ is stopped.

Further, consider a case where the belt W is drawn out when the take-up force locking mechanism is operating, whereafter the draw-out force is eliminated and the belt is rewound by the force of the take-up spring 4. The belt is rewound, and is suddenly stopped when the take-up force locking mechanism has come to its initial operative position of FIG. 1. Even if the shaft $3b$ is suddenly stopped at this time, the latch frame 35 tries to continue to rotate due to its inertia. Accordingly, the latch ring 33 is pushed axially inwardly along the cam surface $35a$ and the teeth $33a$ try to mesh with the projections 30 on the side plate portion 1. Even if the teeth $33a$ mesh with the projection 30, unless the shaft $3b$ rotates in the draw-out direction, the latch ring 33 is again pushed outwardly by the force of the latch-up spring 32 and thus, no problem arises. However, when the state of FIG. 1 has been reached, the shaft $3b$ tries to rotate somewhat in the draw-out direction by the reaction of the first cam 10 and the second cam 12 striking against each other or the restoration of the main gear 5, the idle gear 9, the stop gear 11, the first cam 10 and the second cam 12 from their elastic deformation imparted by the shock at their initial operative positions, or both, and this leaves a problem. That is, the latch ring 33 may mesh with the projections 30 slightly before it is pushed outwardly by the force of the spring 32 and this leads to the undesirable possibility that the belt cannot move in either the draw-out direction or the rewind direction.

However, when the shaft $3b$ is suddenly stopped as described above, the sensor ratchet 36 rotates clockwise earlier than the latch frame 35 because the sensor ratchet has a greater inertia than the latch frame 35 and as a result, the latch frame 35 rotates counter-clockwise relative to the sensor ratchet 36. Accordingly, by the same process as that described previously, the locking piece 38 meshes with an internal tooth of the ratchet gear 41 and, when the belt is drawn out from this state, the reed switch 47 is switched off and the take-up force locking mechanism is rendered inoperative and therefore, no problem arises.

Thus, if the take-up force locking condition is released and the belt is taken up, the belt draw-out locking-up condition by the emergency locking mechanism will also be released and if thereafter the same belt operation as that previously described is effected, the take-up force locking mechanism will again become operative.

Now, the present invention has been hitherto described with respect to one embodiment thereof, whereas the construction of the take-up force locking mechanism and the construction of the emergency locking mechanism are not restricted thereto, but the present invention can be applied to any device in which there is the possibility that the take-up force locking condition and the emergency locking condition occur concurrently.

Also, in the above-described embodiment, the electrical switch means (which is not limited to a reed switch, but may also be a contact switch, a proximity switch or the like) is operated by responding to the movement of a part of the emergency locking mechanism during the operation thereof, but where the take-up force locking mechanism includes no electrical means, the movement thereof may be intactly utilized as a mechanical movement.

According to the present invention, as described above, the problem that both of the draw-out and the rewinding of the belt become impossible when the take-up force locking means and the emergency locking means are combined together can be solved by simply adding releasing means for bringing the take-up force locking means into its inoperative condition.

I claim:

1. An emergency locking type retractor comprising: reel shaft means biased in a belt take-up direction and rotatably supported by a base member;

belt take-up force locking means capable of assuming an operative condition and an inoperative condition, said locking means preventing a belt take-up force from being applied to a belt at at least one point during belt wearing in said operative condition and incapable of preventing the belt take-up force from being applied to the belt in said inoperative condition;

emergency locking means capable of assuming first and second conditions, said emergency locking means permitting said reel shaft means to rotate freely in the first condition and being operated, upon detecting a speed change of a vehicle body over a predetermined value, to act on the reel shaft means to prevent draw-out of the belt in the second condition; and releasing means for bringing said belt take-up force locking means into the inoperative condition in response to change of said emergency locking means from the first condition to the second condition when said take-up force locking means is in said operative condition.

2. An emergency locking type retractor according to claim 1, wherein said releasing means includes means engageable with a portion of said emergency locking means when said emergency locking means operates for bringing said belt take-up force locking means into said inoperative condition.

3. An emergency locking type retractor according to claim 2, wherein said releasing means comprises a projection displaceable on said reel shaft means by a predetermined amount in the belt draw-out direction during the operation of said emergency locking means, and a reed switch adapted to be brought into an OFF state in response to displacement of said projection by said predetermined amount, said belt take-up force locking means being brought into said inoperative condition in response to said reed switch being brought into its OFF state.

4. An emergency locking type retractor comprising: reel shaft means biased in a belt take-up direction and rotatably supported by a base member;

belt take-up force locking means capable of assuming an operative condition and an inoperative condition, said locking means preventing a belt take-up force from being applied to a belt at at least one point during belt wearing in said operative condition and incapable of preventing the belt take-up force from being applied to the belt in said inoperative condition;

emergency locking means capable of assuming first and second conditions, said emergency locking means permitting said reel shaft means to rotate freely in the first condition and being operated, upon detecting a belt draw-out speed over a predetermined value, to act on the reel shaft means to prevent draw-out of the belt in the second condition; and releasing means for bringing said belt take-up force locking means into the inoperative condition in response to change of said emergency locking means from the first condition to the second condition when said take-up force locking means is in said operative condition.

5. An emergency locking type retractor according to claim 4, wherein said releasing means includes means engageable with a portion of said emergency locking means when said emergency locking means operates for bringing said belt take-up force locking means into said inoperative condition.

6. An emergency locking type retractor according to claim 5, wherein said releasing means comprises a projection displaceable on said reel shaft means by a predetermined amount in the belt draw-out direction during the operation of said emergency locking means, and a reed switch adapted to be brought into an OFF state in response to displacement of said projection by said predetermined amount, said belt take-up force locking means being brought into said inoperative condition in response to said reed switch being brought into its OFF state.

* * * * *